(12) United States Patent
Grube et al.

(10) Patent No.: US 10,768,833 B2
(45) Date of Patent: Sep. 8, 2020

(54) OBJECT DISPERSAL LOAD BALANCING

(71) Applicant: International Business Machines Corporation, Armonk, NY (US)

(72) Inventors: Gary W. Grube, Barrington Hills, IL (US); Greg R. Dhuse, Chicago, IL (US); Wesley B. Leggette, Chicago, IL (US); Jason K. Resch, Chicago, IL (US); Andrew D. Baptist, Mt. Pleasant, WI (US); Ilya Volvovski, Chicago, IL (US)

(73) Assignee: PURE STORAGE, INC., Mountain View, CA (US)

( * ) Notice: Subject to any disclaimer, the term of this patent is extended or adjusted under 35 U.S.C. 154(b) by 254 days.

(21) Appl. No.: 15/819,198

(22) Filed: Nov. 21, 2017

(65) Prior Publication Data

US 2018/0095688 A1    Apr. 5, 2018

Related U.S. Application Data

(63) Continuation-in-part of application No. 15/238,165, filed on Aug. 16, 2016, now Pat. No. 10,289,318.
(Continued)

(51) Int. Cl.
*G06F 3/06* (2006.01)
*G06F 11/10* (2006.01)
*H04L 29/08* (2006.01)

(52) U.S. Cl.
CPC .......... *G06F 3/0631* (2013.01); *G06F 3/064* (2013.01); *G06F 3/0604* (2013.01); *G06F 3/067* (2013.01);
(Continued)

(58) Field of Classification Search
CPC ...... G06F 3/0604; G06F 3/0619; G06F 3/064; G06F 3/0659; G06F 3/0631; G06F 11/1076
See application file for complete search history.

(56) References Cited

U.S. PATENT DOCUMENTS

| 4,092,732 A | 5/1978 | Ouchi |
| 5,454,101 A | 9/1995 | Mackay et al. |

(Continued)

OTHER PUBLICATIONS

Shamir; How to Share a Secret; Communications of the ACM; vol. 22, No. 11; Nov. 1979; pp. 612-613.
(Continued)

*Primary Examiner* — Kannan Shanmugasundaram
(74) *Attorney, Agent, or Firm* — Garlick & Markison; Timothy W. Markison; Timothy D. Taylor

(57) ABSTRACT

A method includes dividing dispersed storage error encoding of a data object into a plurality of operations based on at least one of the data object and available computing devices for executing the dispersed storage error encoding. The method further includes allocating the plurality of operations to the available computing devices, where a first encoding operation of the plurality of encoding operations is allocated to a first computing device of the available computing devices. The method further includes coordinating execution of the plurality of operations by the available computing devices to dispersed storage error encode the data object into a plurality of sets of encoded data slices and a corresponding plurality of sets of slice names, and write the plurality of sets of encoded data slices based on the corresponding plurality of sets of slice names to a set of storage units.

16 Claims, 11 Drawing Sheets

Related U.S. Application Data which is a continuation-in-part of application No. 13/270,528, filed on Oct. 11, 2011, now Pat. No. 10,216,647.

(60) Provisional application No. 61/408,980, filed on Nov. 1, 2010.

(52) U.S. Cl.
CPC .......... *G06F 3/0619* (2013.01); *G06F 3/0635* (2013.01); *G06F 3/0659* (2013.01); *G06F 11/1076* (2013.01); *H04L 67/1097* (2013.01)

(56) References Cited

U.S. PATENT DOCUMENTS

| | | |
|---|---|---|
| 5,485,474 A | 1/1996 | Rabin |
| 5,774,643 A | 6/1998 | Lubbers et al. |
| 5,802,364 A | 9/1998 | Senator et al. |
| 5,809,285 A | 9/1998 | Hilland |
| 5,890,156 A | 3/1999 | Rekieta et al. |
| 5,987,622 A | 11/1999 | Lo Verso et al. |
| 5,991,414 A | 11/1999 | Garay et al. |
| 6,012,159 A | 1/2000 | Fischer et al. |
| 6,058,454 A | 5/2000 | Gerlach et al. |
| 6,128,277 A | 10/2000 | Bruck et al. |
| 6,175,571 B1 | 1/2001 | Haddock et al. |
| 6,192,472 B1 | 2/2001 | Garay et al. |
| 6,256,688 B1 | 7/2001 | Suetaka et al. |
| 6,272,658 B1 | 8/2001 | Steele et al. |
| 6,301,604 B1 | 10/2001 | Nojima |
| 6,356,949 B1 | 3/2002 | Katsandres et al. |
| 6,366,995 B1 | 4/2002 | Vilkov et al. |
| 6,374,336 B1 | 4/2002 | Peters et al. |
| 6,415,373 B1 | 7/2002 | Peters et al. |
| 6,418,539 B1 | 7/2002 | Walker |
| 6,449,688 B1 | 9/2002 | Peters et al. |
| 6,567,948 B2 | 5/2003 | Steele et al. |
| 6,571,282 B1 | 5/2003 | Bowman-Amuah |
| 6,609,223 B1 | 8/2003 | Wolfgang |
| 6,718,361 B1 | 4/2004 | Basani et al. |
| 6,760,808 B2 | 7/2004 | Peters et al. |
| 6,785,768 B2 | 8/2004 | Peters et al. |
| 6,785,783 B2 | 8/2004 | Buckland |
| 6,826,711 B2 | 11/2004 | Moulton et al. |
| 6,879,596 B1 | 4/2005 | Dooply |
| 7,003,688 B1 | 2/2006 | Pittelkow et al. |
| 7,024,451 B2 | 4/2006 | Jorgenson |
| 7,024,609 B2 | 4/2006 | Wolfgang et al. |
| 7,080,101 B1 | 7/2006 | Watson et al. |
| 7,103,824 B2 | 9/2006 | Halford |
| 7,103,915 B2 | 9/2006 | Redlich et al. |
| 7,111,115 B2 | 9/2006 | Peters et al. |
| 7,140,044 B2 | 11/2006 | Redlich et al. |
| 7,146,644 B2 | 12/2006 | Redlich et al. |
| 7,171,493 B2 | 1/2007 | Shu et al. |
| 7,222,133 B1 | 5/2007 | Raipurkar et al. |
| 7,240,236 B2 | 7/2007 | Cutts et al. |
| 7,272,613 B2 | 9/2007 | Sim et al. |
| 7,636,724 B2 | 12/2009 | de la Torre et al. |
| 2002/0062422 A1 | 5/2002 | Butterworth et al. |
| 2002/0166079 A1 | 11/2002 | Ulrich et al. |
| 2003/0018927 A1 | 1/2003 | Gadir et al. |
| 2003/0037261 A1 | 2/2003 | Meffert et al. |
| 2003/0065617 A1 | 4/2003 | Watkins et al. |
| 2003/0084020 A1 | 5/2003 | Shu |
| 2004/0024963 A1 | 2/2004 | Talagala et al. |
| 2004/0122917 A1 | 6/2004 | Menon et al. |
| 2004/0215998 A1 | 10/2004 | Buxton et al. |
| 2004/0228493 A1 | 11/2004 | Ma et al. |
| 2005/0100022 A1 | 5/2005 | Ramprashad |
| 2005/0114594 A1 | 5/2005 | Corbett et al. |
| 2005/0125593 A1 | 6/2005 | Karpoff et al. |
| 2005/0131993 A1 | 6/2005 | Fatula, Jr. |
| 2005/0132070 A1 | 6/2005 | Redlich et al. |
| 2005/0144382 A1 | 6/2005 | Schmisseur |
| 2005/0229069 A1 | 10/2005 | Hassner |
| 2006/0047907 A1 | 3/2006 | Shiga et al. |
| 2006/0136448 A1 | 6/2006 | Cialini et al. |
| 2006/0156059 A1 | 7/2006 | Kitamura |
| 2006/0224603 A1 | 10/2006 | Correll, Jr. |
| 2007/0079081 A1 | 4/2007 | Gladwin et al. |
| 2007/0079082 A1 | 4/2007 | Gladwin et al. |
| 2007/0079083 A1 | 4/2007 | Gladwin et al. |
| 2007/0088970 A1 | 4/2007 | Buxton et al. |
| 2007/0174192 A1 | 7/2007 | Gladwin et al. |
| 2007/0214285 A1 | 9/2007 | Au |
| 2007/0234110 A1 | 10/2007 | Soran |
| 2007/0283167 A1 | 12/2007 | Venters, III et al. |
| 2009/0094251 A1 | 4/2009 | Gladwin et al. |
| 2009/0094318 A1 | 4/2009 | Gladwin et al. |
| 2010/0023524 A1 | 1/2010 | Gladwin et al. |
| 2010/0037056 A1* | 2/2010 | Follis ............... G06F 11/1464 707/E17.005 |
| 2012/0047111 A1* | 2/2012 | Hayden ............. G06F 16/184 707/649 |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

Kubiatowicz, et al.; OceanStore: An Architecture for Global-Scale Persistent Storage; Proceedings of the Ninth International Confer-

(56) References Cited

OTHER PUBLICATIONS ence on Architectural Support for Programming Languages and Operating Systems (ASPLOS 2000); Nov. 2000; pp. 1-12.

* cited by examiner

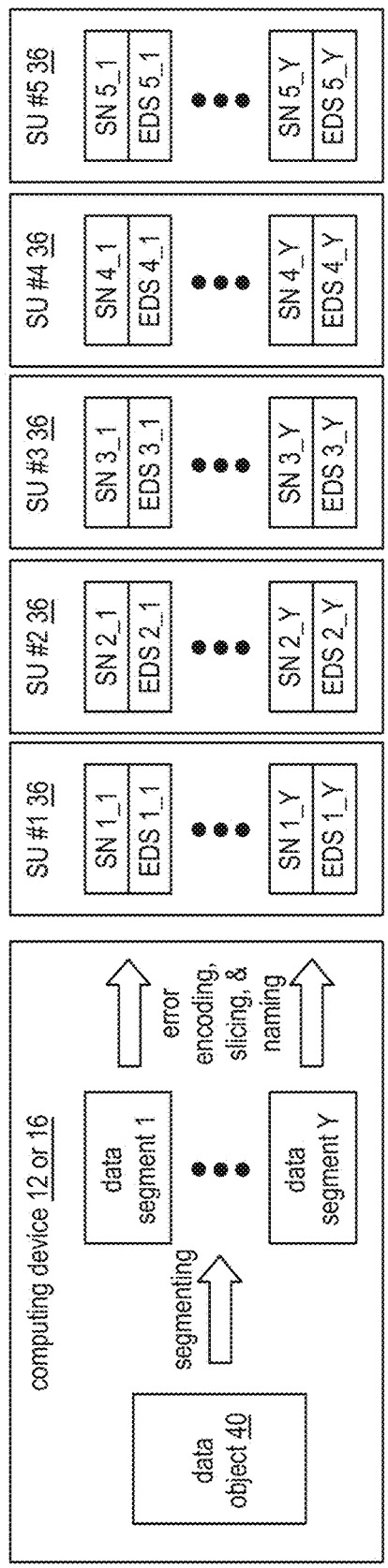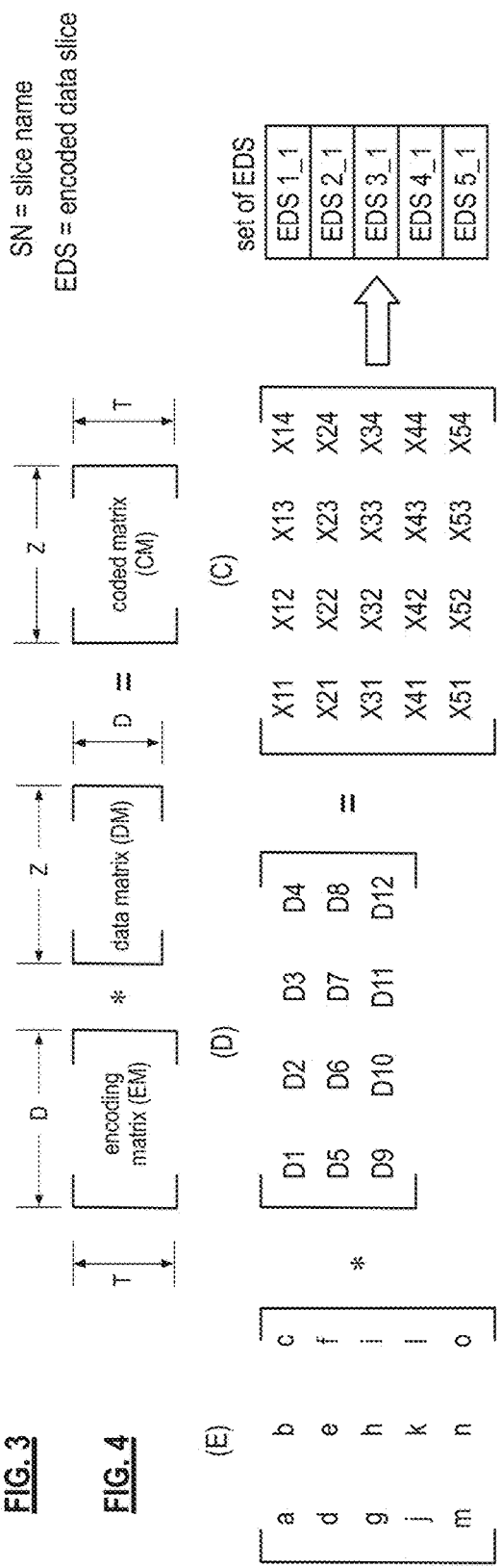

encoding matrix operation 90 unity matrix operation 96 unity matrix $$\begin{bmatrix} a & b & c \\ d & e & f \\ g & h & i \end{bmatrix}$$

* data matrix $$\begin{bmatrix} D1 & D2 & D3 & D4 \\ D5 & D6 & D7 & D8 \\ D9 & D10 & D11 & D12 \end{bmatrix}$$

= unity coded matrix $$\begin{bmatrix} X11 & X12 & X13 & X14 \\ X21 & X22 & X23 & X24 \\ X31 & X32 & X33 & X34 \end{bmatrix}$$

X11 = aD1 + bD5 + cD9     X21 = dD1 + eD5 + fD9     X31 = gD1 + hD5 + iD9
X12 = aD2 + bD6 + cD10    X22 = dD2 + eD6 + fD10    X32 = gD2 + hD6 + iD10
X13 = aD3 + bD7 + cD11    X23 = dD3 + eD7 + fD11    X33 = gD3 + hD7 + iD11
X14 = aD4 + bD8 + cD12    X24 = dD4 + eD8 + fD12    X34 = gD4 + hD8 + iD12 redundancy operation 98 redundancy $$\begin{bmatrix} j & k & l \\ m & n & o \end{bmatrix}$$

* data matrix $$\begin{bmatrix} D1 & D2 & D3 & D4 \\ D5 & D6 & D7 & D8 \\ D9 & D10 & D11 & D12 \end{bmatrix}$$

= redundancy coded matrix $$\begin{bmatrix} X41 & X42 & X43 & X44 \\ X51 & X52 & X53 & X54 \end{bmatrix}$$

X41 = jD1 + kD5 + lD9     X51 = mD1 + nD5 + oD9
X42 = jD2 + kD6 + lD10    X52 = mD2 + nD6 + oD10
X43 = jD3 + kD7 + lD11    X53 = mD3 + nD7 + oD11
X44 = jD4 + kD8 + lD12    X54 = mD4 + nD8 + oD12

FIG. 10 redundancy operation 98 first redundancy operation 104

1st redundancy $\begin{bmatrix} j & k & l \end{bmatrix}$ * data matrix $\begin{bmatrix} D1 & D2 & D3 & D4 \\ D5 & D6 & D7 & D8 \\ D9 & D10 & D11 & D12 \end{bmatrix}$ = 1st redundancy coded matrix $\begin{bmatrix} X41 & X42 & X43 & X44 \end{bmatrix}$ X41 = jD1 + kD5 + lD9
X42 = jD2 + kD6 + lD10
X43 = jD3 + kD7 + lD11
X44 = jD4 + kD8 + lD12 second redundancy operation 106

2nd redundancy $\begin{bmatrix} m & n & o \end{bmatrix}$ * data matrix $\begin{bmatrix} D1 & D2 & D3 & D4 \\ D5 & D6 & D7 & D8 \\ D9 & D10 & D11 & D12 \end{bmatrix}$ = 2nd redundancy coded matrix $\begin{bmatrix} X51 & X52 & X53 & X54 \end{bmatrix}$ X51 = mD1 + nD5 + oD9
X52 = mD2 + nD6 + oD10
X53 = mD3 + nD7 + oD11
X54 = mD4 + nD8 + oD12

FIG. 12

OBJECT DISPERSAL LOAD BALANCING

CROSS-REFERENCE TO RELATED APPLICATIONS

The present U.S. Utility patent application claims priority pursuant to 35 U.S.C. § 120 as a continuation-in-part of U.S. Utility application Ser. No. 15/238,165, entitled "ADJUSTING OPTIMISTIC WRITES IN A DISPERSED STORAGE NETWORK," filed Aug. 16, 2016, which claims priority pursuant to 35 U.S.C. § 120 as a continuation-in-part of U.S. Utility application Ser. No. 13/270,528, entitled "COMPACTING DISPERSED STORAGE SPACE," filed Oct. 11, 2011, which claims priority pursuant to 35 U.S.C. § 119(e) to U.S. Provisional Application No. 61/408,980, entitled "DISPERSED STORAGE NETWORK COMMUNICATION," filed Nov. 1, 2010, all of which are hereby incorporated herein by reference in their entirety and made part of the present U.S. Utility patent application for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

In computing, it is further known that load balancing can be used to improve the distribution of workloads via a plurality of computing devices.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

FIG. 10 is schematic block diagram of an example of an encoding matrix operation in accordance with the present invention;

FIG. 12 is schematic block diagram of an example of a redundancy operation in accordance with the present invention;

DETAILED DESCRIPTION OF THE INVENTION

Figure 1:
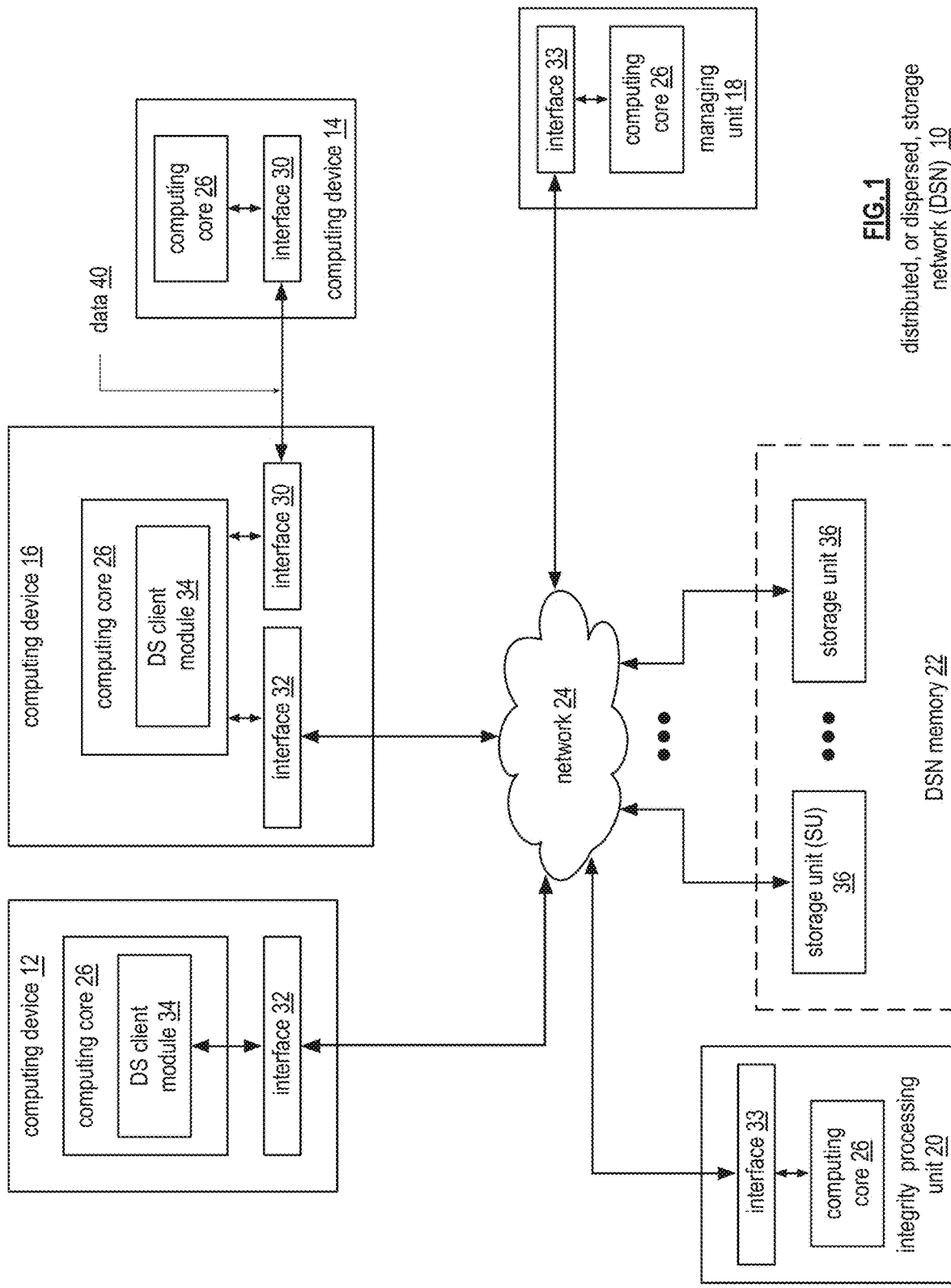
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
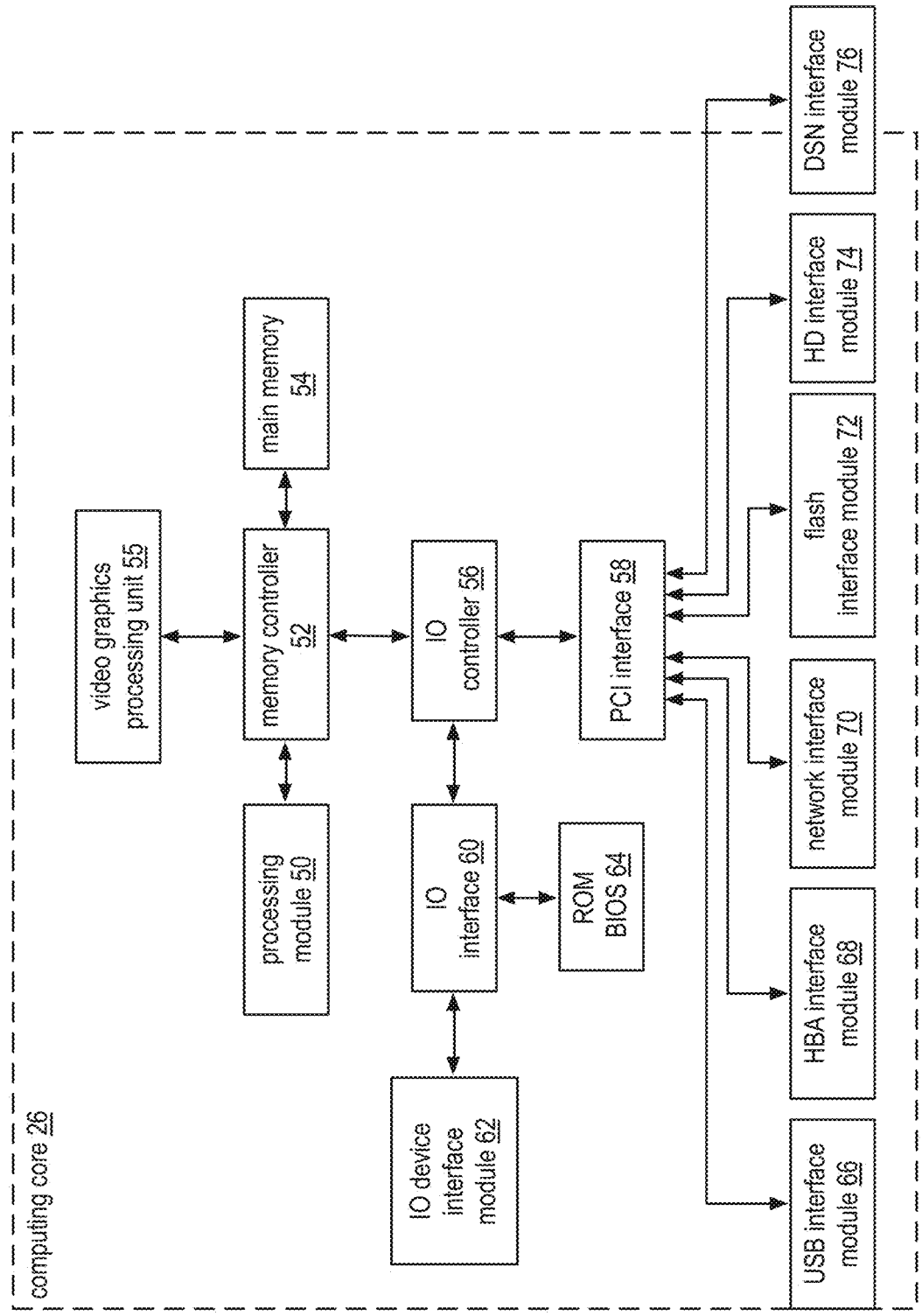
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSTN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSTN managing unit 18 tracks the number of times a user accesses a non-public vault and/or public vaults, which can be used to generate a per-access billing information. In another instance, the DSTN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSTN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 60 is shown in FIG. 6. As shown, the slice name (SN) 60 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 7:
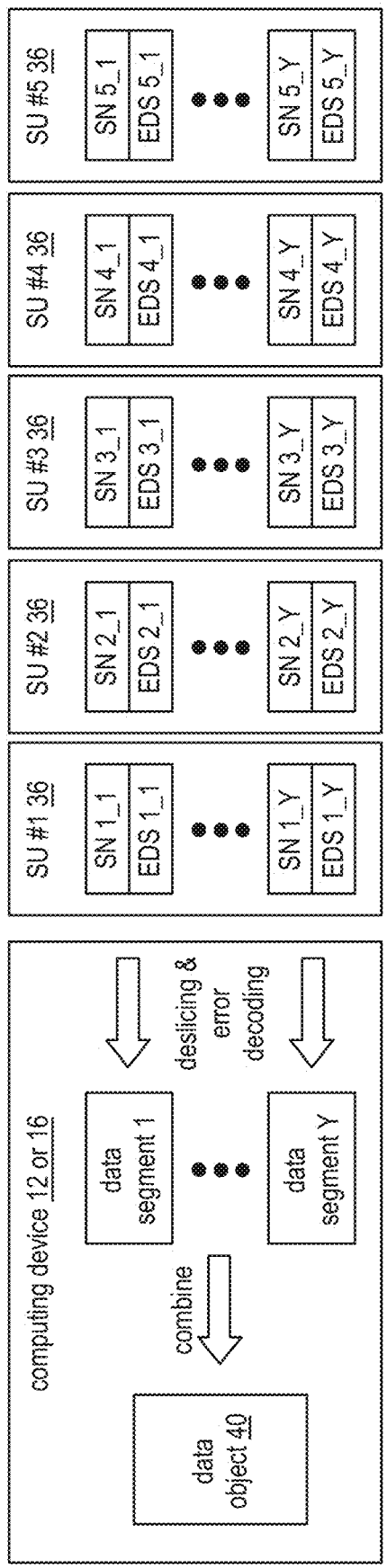
FIG. 7 is a schematic block diagram of an example of dispersed storage error decoding of data in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

Figure 8:
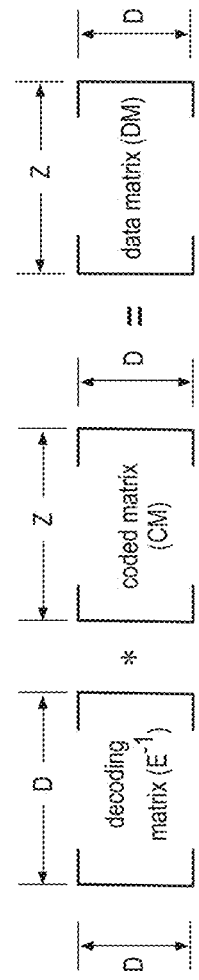
FIG. 8 is a schematic block diagram of a generic example of an error decoding function in accordance with the present invention.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9:
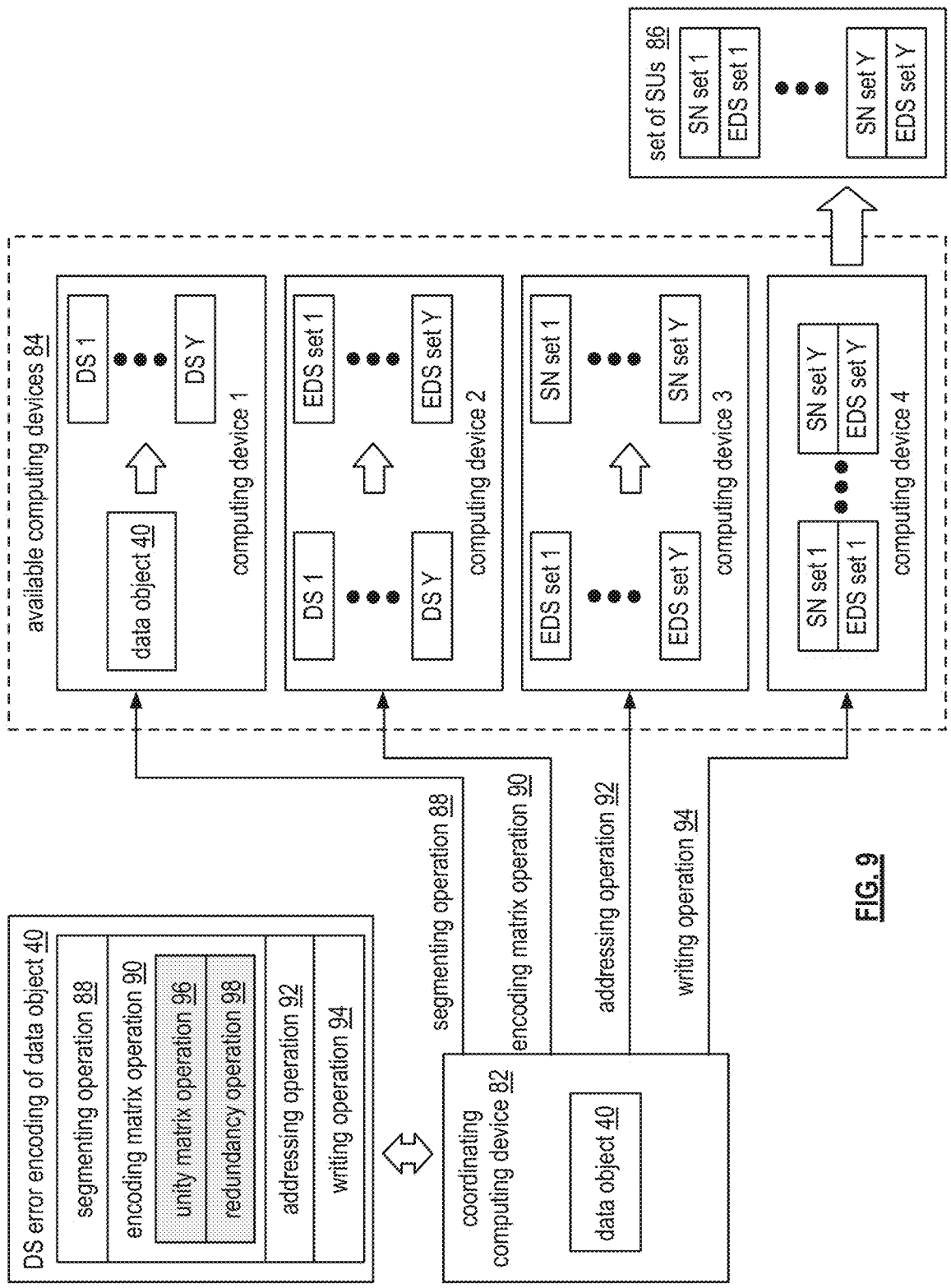
FIG. 9 is a schematic block diagram of the dispersed or distributed storage network (DSN) in accordance with the present invention.

FIG. 9 is a schematic block diagram of the dispersed or distributed storage network (DSN) that includes data object 40, a coordinating computing device 82, available computing devices 84 (e.g., computing devices 1-4), and a set of storage units (SUs) 86. In order to balance the load of dispersed storage error encoding data object 40 and improve processing performance, the coordinating computing device 82 is operable to divide and coordinate dispersed error encoding data object 40 among available computing devices 84 (e.g., computing devices that are available for executing dispersed storage error encoding).

In an example of operation, coordinating computing device 82 divides the dispersed error encoding of data object 40 into a plurality of operations. An operation of the plurality of operations includes at least a portion of a segmenting operation 88, an encoding matrix operation 90, an addressing operation 92, and a writing operation 94. The encoding matrix operation 90 includes a unity matrix operation 96 and a redundancy operation 98. The coordinating computing device 82 determines that computing devices 1-4 are available computing devices 84 for dispersed error encoding the data object 40 by one or more of a default setting (e.g., a known group of available computing devices is selected) and a loading function (e.g., one or more computing devices are selected based on requirements needed to process the plurality of operations). Coordinating computing device 82 may also determine that it is one of the available computing devices.

The coordinating computing device 82 divides the dispersed storage error encoding into the plurality operations based on data object 40 and/or the available computing devices 84. For example, the coordinating computing device 82 determines to divide the dispersed storage error encoding of data object 40 among more available computing devices 84 when the data object 40 requires more dispersed error encoding load processing (e.g., the data object is over a certain size and/or of a certain type of data) versus a data object that requires less dispersed error encoding load processing. Further, the amount of available computing devices 84 and the processing abilities of those available computing devices 84 also determine how the coordinating computing device 82 divides the dispersed error encoding of data object 40.

The coordinating computing device 82 allocates the plurality of operations to the available computing devices 84. Here, the coordinating computing device 82 divided dispersed error encoding of data object 40 into the segmenting operation 88, the encoded matrix operation 90, the addressing operation 92, and the writing operation 94. The coordinating computing device 82 allocates the segmenting operation 88 to computing device 1, the encoded matrix operation 90 to computing device 2, the addressing operation 92 to computing device 3, and the writing operation 94 to computing device 4.

The coordinating computing device 82 coordinates execution of the plurality of operations by the available computing devices to dispersed storage error encode the data object into a plurality of sets of encoded data slices and a corresponding plurality of sets of slice names and write the plurality of sets of encoded data slices based on the corresponding plurality of sets of slice names to the set of storage units 86 of the DSN.

The coordinating computing device 82 coordinates execution of the segmenting operation 88 by computing device 1 to segment the data object 40 into a set of data segments (DS 1-DS Y). The coordinating computing device 82 coordinates execution of the encoding matrix operation 90 by computing device 2 to apply an encoding matrix to each data segment of the set of data segments (DS 1-DS Y) to produce a plurality of sets of error encoded data slices (EDS sets 1-Y). The coordinating computing device 82 coordinates execution of the addressing operation 92 by computing device 3 to produce a corresponding plurality of sets of slice names (SN set 1-SN set Y) for EDS sets 1-Y. The coordinating computing device 82 coordinates execution of the writing operation 94 by computing device 4 to write EDS sets 1-Y based on SN set 1-SN set Y to the set of storage units 86.

To coordinate the execution of the plurality of operations, the coordinating computing device 82 sends operation result destination instructions to computing devices 1-4 to advise computing devices 1-4 on where to send a result of an executed operation of the plurality of operations. For example, computing device 1 is sent an operation result destination instruction to send DS 1-DS Y to computing device 2, computing device 2 is sent an operation result destination instruction to send EDS sets 1-Y to computing device 3, and computing device 3 is sent an operation result destination instruction to send EDS sets 1-Y and SN set 1-SN set Y to computing device 4.

Alternatively, to coordinate the execution of the plurality of operations, the coordinating computing device 82 sends a dispersed error encoding division scheme to each computing device of computing devices 1-4. The dispersed error encoding division scheme includes a list of each operation of the plurality of operations and a corresponding computing device of the available computing devices executing the operation. Sending the dispersed error encoding division scheme to each computing devices 1-4 will instruct the available computing devices as to which operation of the plurality of operations to execute and where to send a result of an executed operation.

FIG. 10 is a schematic block diagram of an example of an encoding matrix operation 90 that includes a unity matrix operation 96 and a redundancy operation 98. To produce the data matrix of both the unity matrix operation 96 and the redundancy operation 98, a first data segment of a set of data segments of a data object is divided into twelve data blocks (D1-D12). Referring to the generic Cauchy Reed-Solomon encoding function illustrated in FIG. 4, the encoding matrix (E) includes a unity portion (blocks a-i) and a redundancy portion (blocks j-o) within the same matrix. Here, the unity portion is separated from the encoding matrix (E) as a unity matrix in the unity matrix operation 96 and the redundancy portion is separated from the encoding matrix (E) as a redundancy matrix in the redundancy operation 98.

A unity coded matrix of the unity matrix operation 96 is produced by matrix multiplying the data matrix by the unity matrix. The unity coded matrix includes three rows of coded data blocks, where the first row of X11-X14 corresponds to a first encoded data slice (EDS 1_1), the second row of X21-X24 corresponds to a second encoded data slice (EDS 2_1), and the third row of X31-X34 corresponds to a third encoded data slice (EDS 3_1). Note that the second number of the EDS designation corresponds to the data segment number.

A redundancy coded matrix of the redundancy operation 98 is produced by matrix multiplying the data matrix by the redundancy matrix. The redundancy coded matrix includes two rows of coded data blocks, where the first row of X41-X44 corresponds to a fourth encoded data slice (EDS 4_1), and the second row of X51-X54 corresponds to a fifth encoded data slice (EDS 5_1). The combination of the unity coded matrix and the redundancy coded matrix includes all of the encoded data slices of the first data segment.

Figure 11:
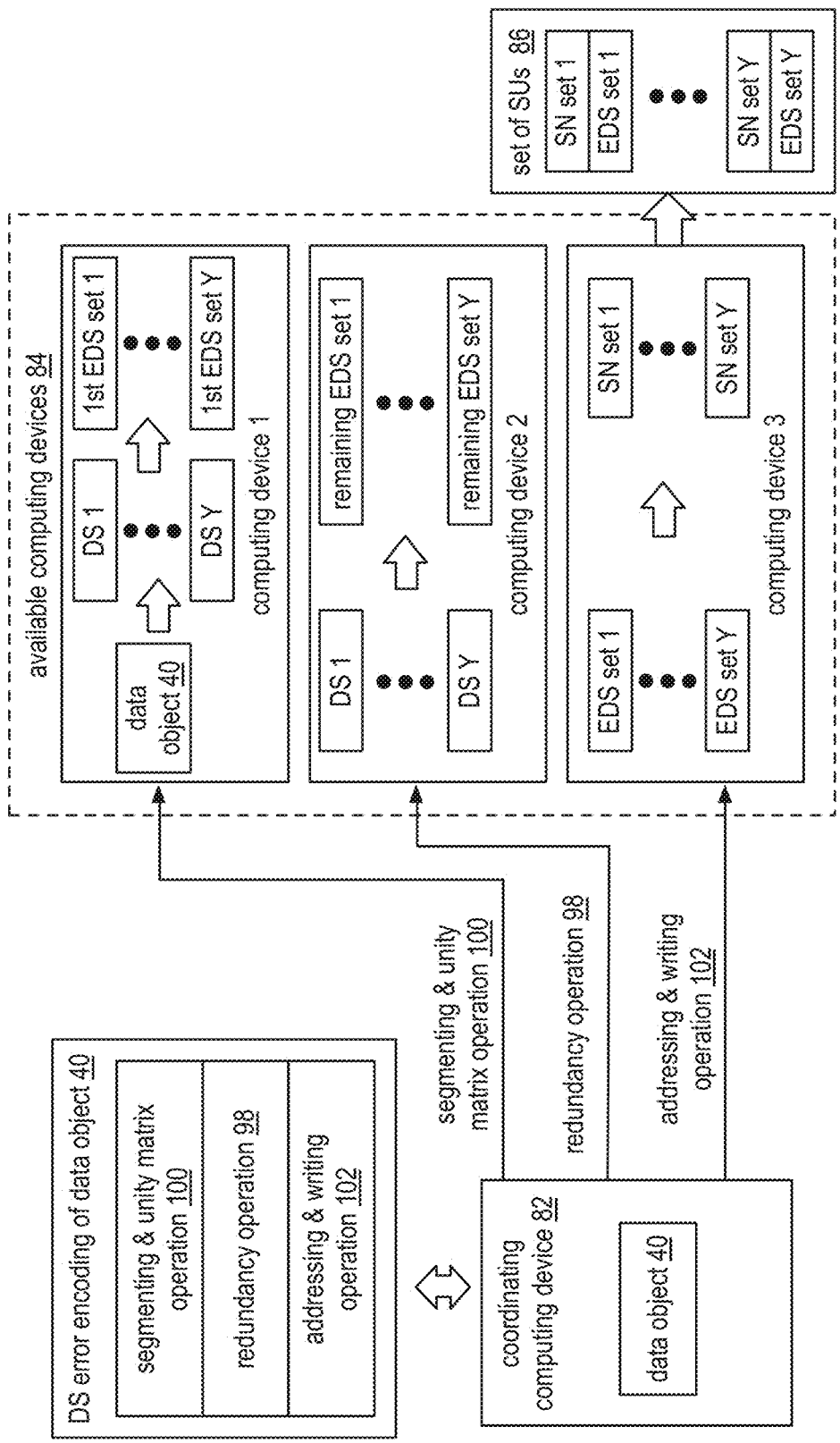
FIG. 11 is a schematic block diagram of the dispersed or distributed storage network (DSN) in accordance with the present invention.

FIG. 11 is a schematic block diagram of the dispersed or distributed storage network (DSN) that includes data object 40, a coordinating computing device 82, available computing devices 84 (e.g., computing devices 1-3), and a set of storage units (SUs) 86. In an example of operation, coordinating computing device 82 divides the dispersed error encoding of data object 40 into a plurality of operations where an operation of the plurality of operations includes at least a portion of a segmenting operation, an encoding matrix operation, an addressing operation, and a writing operation. The encoding matrix operation includes a unity matrix operation and a redundancy operation 98. Here, the coordinating computing device 82 divides the dispersed error encoding of data object 40 into a segmenting and unity matrix operation 100, the redundancy operation 98, and an addressing and writing operation 102.

The coordinating computing device 82 allocates the segmenting and unity matrix operation 100 to computing device 1, the redundancy operation 98 to computing device 2, and the addressing and writing operation 102 to computing device 3.

The coordinating computing device 82 coordinates execution of the segmenting and unity matrix operation 100 by computing device 1 to segment the data object 40 into a set of data segments (DS 1-DS Y) and apply a unity matrix to each data segment of the set of data segments to create a first plurality of sets of encoded data slices of the plurality of sets of encoded data slices (1st EDS sets 1-Y). The coordinating computing device 82 coordinates execution of the redundancy operation 98 by computing device 2 to apply the redundancy operation on each data segment of DS 1-DS Y to produce a remaining plurality of sets of error encoded data slices of the plurality of sets of encoded data slices (remaining EDS sets 1-Y). The coordinating computing device 82 coordinates execution of the addressing and writing operation 102 by computing device 3 to produce a corresponding plurality of sets of slice names (SN set 1-SN set Y) for the plurality of sets of error encoded data slices (EDS sets 1-Y) where EDS sets 1-Y is the combination of 1st EDS sets 1-Y and remaining EDS sets 1-Y and to write EDS sets 1-Y based SN set 1-SN set Y to the set of storage units 86.

To coordinate the execution of the plurality of operations, the coordinating computing device 82 sends operation result destination instructions to computing devices 1-3 to advise computing devices 1-3 on where to send a result of an executed operation of the plurality of operations. For example, computing device 1 is sent an operation result destination instruction to send DS 1-DS Y to computing device 2 and 1st EDS sets 1-Y to computing device 3, and computing device 2 is sent an operation result destination instruction to send remaining EDS sets 1-Y to computing device 3.

Alternatively, to coordinate the execution of the plurality of operations, the coordinating computing device 82 sends a dispersed error encoding division scheme to each computing device of computing devices 1-3. The dispersed error encoding division scheme includes a list of each operation of the plurality of operations and a corresponding computing device of the available computing devices assigned to execute the operation. Sending the dispersed error encoding division scheme to each computing devices 1-3 will instruct the available computing devices as to which operation of the plurality of operations to execute and where to send a result of the executed operation.

FIG. 12 is a schematic block diagram of an example of a redundancy operation 98 that includes a first redundancy operation 104 and a second redundancy operation 106. To produce the data matrix of both the first redundancy operation 104 and the second redundancy operation 106, a first data segment of a set of data segments of a data object is divided into twelve data blocks (D1-D12). Referring to the redundancy operation 98 illustrated in FIG. 10, a redundancy portion of an encoding matrix of a generic Cauchy Reed-Solomon encoding function includes (blocks j-o). Here, a first redundancy portion (blocks j-l) is separated from the redundancy matrix of FIG. 10 to produce a first redundancy matrix of the first redundancy operation 104 and a second redundancy portion (blocks m-o) is separated from the redundancy matrix of FIG. 10 to produce a second redundancy matrix of the second redundancy operation 106.

A first redundancy coded matrix of the first redundancy operation 104 is produced by matrix multiplying the data matrix by the first redundancy matrix. The first redundancy coded matrix includes one row of coded data blocks, where the row of X41-X44 corresponds to a fourth encoded data slice (EDS 4_1). Note that the second number of the EDS designation corresponds to the data segment number.

A second redundancy coded matrix of the second redundancy operation 106 is produced by matrix multiplying the data matrix by the second redundancy matrix. The second redundancy coded matrix includes one row of coded data blocks, where the row of X51-X54 corresponds to a fifth encoded data slice (EDS 5_1). The combination of first redundancy coded matrix and the second redundancy coded matrix includes all of the redundant encoded data slices of the first data segment.

Figure 13:
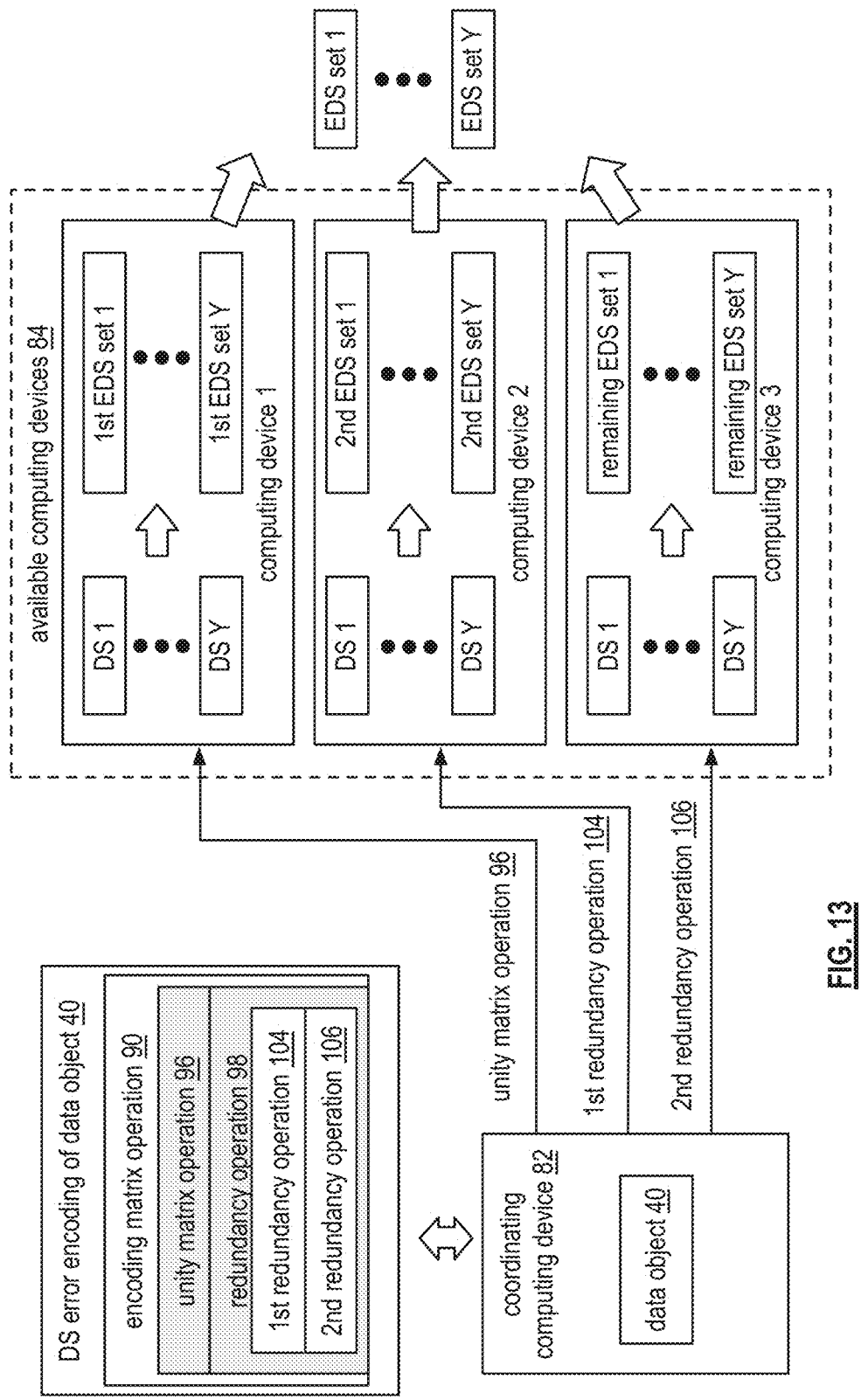
FIG. 13 is a schematic block diagram of the dispersed or distributed storage network (DSN) in accordance with the present invention.

FIG. 13 is a schematic block diagram of the dispersed or distributed storage network (DSN) that includes data object 40, a coordinating computing device 82, and available computing devices 84 (e.g., computing devices 1-3). In an example of allocating an encoding matrix operation 90 of the plurality of operations of dispersed error encoding of data object 40, the coordinating computing device 82 divides the encoding matrix operation 90 into a unity matrix operation 96, a first redundancy operation 104, and a second redundancy operation 106.

The coordinating computing device 82 allocates the unity matrix operation 96 to computing device 1, the first redundancy operation 104 to computing device 2, and the second redundancy operation 106 to computing device 3. The coordinating computing device 82 coordinates execution of the unity matrix operation 100 by computing device 1 to apply a unity matrix to each data segment of a set of data segments of the data object 40 to create a first plurality of sets of encoded data slices of the plurality of sets of encoded data slices (1st EDS sets 1-Y). The coordinating computing device 82 coordinates execution of the first redundancy operation 104 by computing device 2 to apply the first redundancy operation on each data segment of DS 1-DS Y to produce a second plurality of sets of error encoded data slices of the plurality of sets of encoded data slices (2nd EDS sets 1-Y). The coordinating computing device 82 coordinates execution of the second redundancy operation 106 on each data segment of DS 1-DS Y to produce a remaining plurality of sets of error encoded data slices of the plurality of sets of encoded data slices (remaining EDS sets 1-Y). The 1st EDS sets 1-Y, the 2nd EDS sets 1-Y, and remaining EDS sets 1-Y are combined to produce the plurality of sets of encoded data slices (EDS sets 1-Y) of data object 40.

Figure 14:
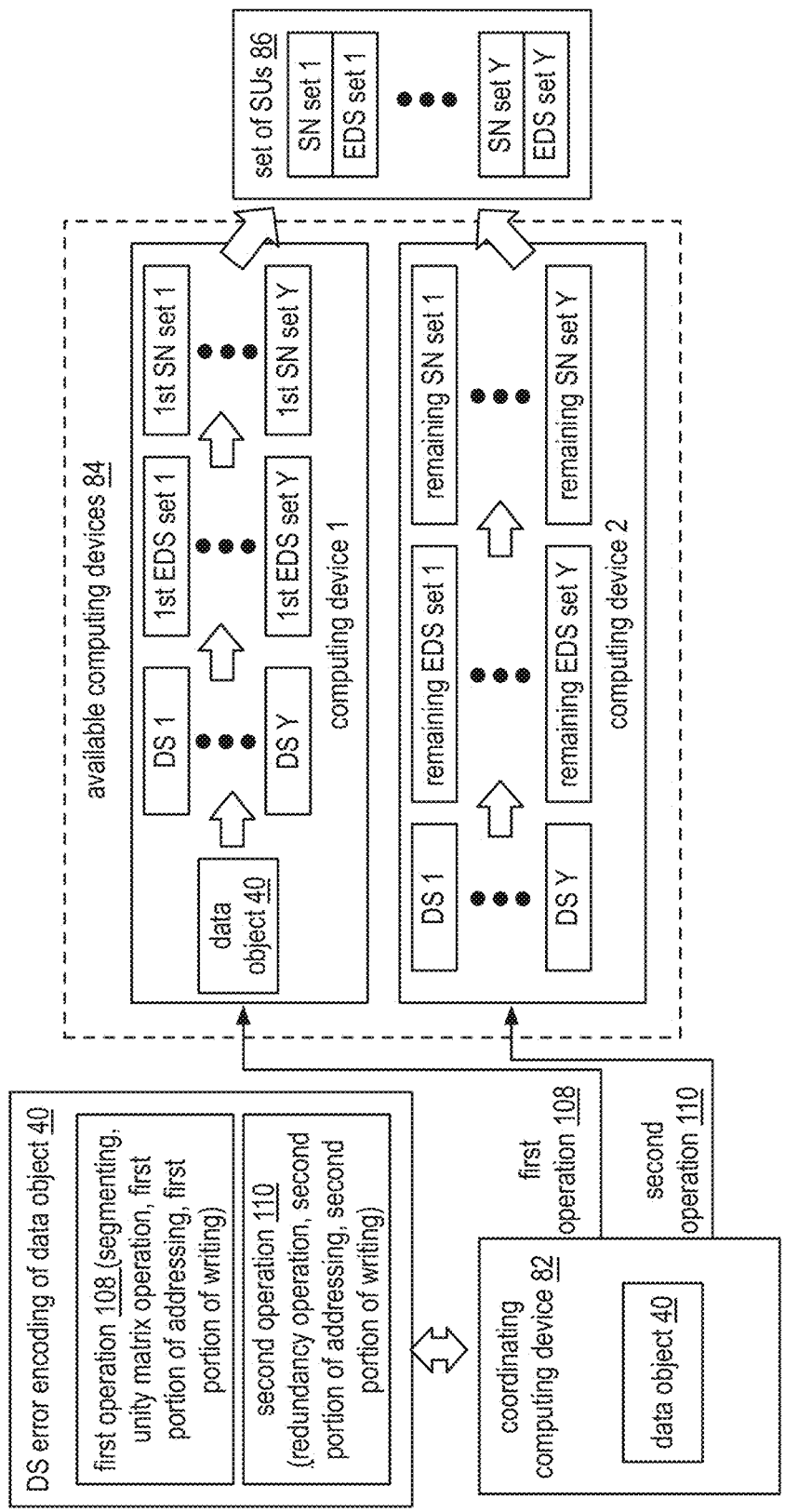
FIG. 14 is a schematic block diagram of the dispersed or distributed storage network (DSN) in accordance with the present invention.

FIG. 14 is a schematic block diagram of the dispersed or distributed storage network (DSN) that includes data object 40, a coordinating computing device 82, available computing devices 84 (e.g., computing devices 1-2), and a set of storage units (SUs) 86. In an example of operation, coordinating computing device 82 divides the dispersed error encoding of data object 40 into a first operation 108 that includes a segmenting operation, a unity matrix operation, a first portion of an addressing operation, and a first portion of the writing operation, and a second operation 110 that includes a redundancy operation, a second portion of the addressing operation, and a second portion of the writing operation. The coordinating computing device 82 allocates the first operation 108 to computing device 1 and the second operation 110 to computing device 2.

The coordinating computing device 82 coordinates execution of the first operation 108 by computing device 1 to segment data object 40 into a set of data segments (DS 1-DS Y), apply the unity matrix operation to DS 1-DS Y to create a first plurality of sets of encoded data slices of the plurality of sets of encoded data slices (1st EDS sets 1-Y), produce a corresponding first plurality of sets of slice names (1st SN sets 1-Y) for 1st EDS sets 1-Y, and to write 1st EDS sets 1-Y based on 1st SN sets 1-Y to the set of storage units 86.

The coordinating computing device 82 coordinates execution of the second operation 110 by computing device 2 to apply the redundancy operation to DS 1-DS Y to create a remaining plurality of sets of encoded data slices (remaining EDS sets 1-Y) of the plurality of sets of encoded data slices, to produce a corresponding remaining plurality of sets of slice names (remaining SN sets 1-Y) for remaining EDS sets 1-Y, and to write the remaining EDS sets 1-Y based on remaining SN sets 1-Y to the set of storage units 86.

To coordinate the execution of the plurality of operations, the coordinating computing device 82 sends operation result destination instructions to computing devices 1-2 to advise computing devices 1-2 on where to send a result of an executed operation of the plurality of operations. For example, computing device 1 is sent an operation result destination instruction to send DS 1-DS Y to computing device 2.

Alternatively, to coordinate the execution of the plurality of operations, the coordinating computing device 82 sends a dispersed error encoding division scheme to each computing device of computing devices 1-2. The dispersed error encoding division scheme includes a list of each operation of the plurality of operations and a corresponding computing device of the available computing devices assigned to execute the operation. Sending the dispersed error encoding division scheme to each computing devices 1-2 will instruct the available computing devices as to which operation of the plurality of operations to execute and where to send a result of the executed operation.

Figure 15:
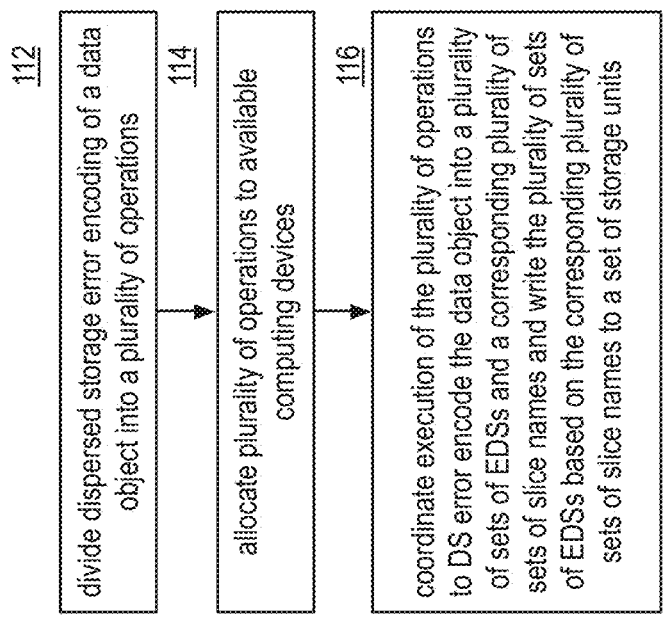
FIG. 15 is a logic diagram of a method of data object dispersed storage error encoding load balancing in accordance with the present invention.

FIG. 15 is a logic diagram of a method of data object dispersed storage error encoding load balancing. The method begins with step 112 where a coordinating computing device of a dispersed storage network (DSN) divides the dispersed error encoding of a data object into a plurality of operations based on at least one of the data object and available computing devices for dispersed storage error encoding. For example, the coordinating computing device determines to divide the dispersed storage error encoding of the data object among more available computing devices when the data object requires more dispersed error encoding load processing (e.g., the data object is over a certain size and/or of a certain type of data) versus a data object that requires less dispersed error encoding load processing. Further, the amount of available computing devices and the processing abilities of those available computing devices also determine how the coordinating computing device divides the dispersed error encoding of the data object.

An operation of the plurality of operations includes at least a portion of a segmenting operation, an encoding matrix operation, an addressing operation, and a writing operation. The encoding matrix operation includes a unity matrix operation and a redundancy operation. The coordinating computing device determines available computing devices for dispersed error encoding the data object by one or more of a default setting (e.g., a known group of available computing devices is selected) and a loading function (e.g., one or more computing devices are selected based on requirements needed to process the plurality of operations). The coordinating computing device may also determine that it is one of the available computing devices.

The method continues with step 114 where the coordinating computing device allocates the plurality of operations to the available computing devices. Dividing the dispersed error encoding of the data object among the available computing devices balances the dispersed error encoding load of data object and improves processing performance.

The method continues with step 116 where the coordinating computing device coordinates execution of the plurality of operations by the available computing devices to dispersed storage error encode the data object into a plurality of sets of encoded data slices and a corresponding plurality of sets of slice names and write the plurality of sets of encoded data slices based on the corresponding plurality of sets of slice names to the set of storage units of the DSN.

To coordinate the execution of the plurality of operations, the coordinating computing device sends operation result destination instructions to the available computing devices. An operation result destination instruction of the operation result destination instructions directs a computing device of the available computing devices to send a result of an executed operation of the plurality of operations to a particular location.

Alternatively, to coordinate the execution of the plurality of operations, the coordinating computing device sends a dispersed error encoding division scheme to each computing device of the available computing devices. The dispersed error encoding division scheme includes a list of each operation of the plurality of operations and a corresponding computing device of the available computing devices assigned to execute the operation. Sending the dispersed error encoding division scheme to the available computing devices will instruct the available computing devices as to which operation of the plurality of operations to execute and where to send a result of the executed operation.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/ or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method comprises:
   dividing, by a coordinating computing device of a dispersed storage network (DSN), dispersed storage error encoding of a data object into a plurality of operations based on at least one of the data object and available computing devices for executing the dispersed storage error encoding, wherein an operation of the plurality of operations includes at least a portion of: a segmenting operation, an encoding matrix operation, an addressing operation, and a writing operation, wherein the encoding matrix operation includes a unity matrix operation and a redundancy operation;
   allocating, by the coordinating computing device, the plurality of operations to the available computing devices, wherein at least one of the plurality of operations is allocated to a first computing device of the available computing devices; and
   coordinating, by the coordinating computing device, execution of the plurality of operations by the available computing devices to dispersed storage error encode the data object into a plurality of sets of encoded data slices and a corresponding plurality of sets of slice names, and write the plurality of sets of encoded data slices based on the corresponding plurality of sets of slice names to a set of storage units of the DSN.

2. The method of claim 1 further comprises:
   dividing, by the coordinating computing device, the dispersed storage error encoding of the data object into the segmenting operation, the encoding matrix operation, the addressing operation, and the writing operation;
   allocating, by the coordinating computing device, the segmenting operation to the first computing device, the encoding matrix operation to a second computing device of the available computing devices, the addressing operation to a third computing device of the available computing devices, and the writing operation to a fourth computing device of the available computing devices;
   coordinating, by the coordinating computing device, execution of the segmenting operation by the first computing device to segment the data object into a set of data segments;
   coordinating, by the coordinating computing device, execution of the encoding matrix operation by the second computing device to apply an encoding matrix to each data segment of the set of data segments to produce the plurality of sets of encoded data slices;
   coordinating, by the coordinating computing device, execution of the addressing operation by the third computing device to produce the corresponding plurality of sets of slice names for the plurality of sets of encoded data slices; and
   coordinating, by the coordinating computing device, execution of the writing operation by the fourth computing device to write the plurality of sets of encoded data slices based on the corresponding plurality of sets of slice names to the set of storage units of the DSN.

3. The method of claim 1 further comprises:
   dividing, by the coordinating computing device, the dispersed storage error encoding of the data object into a segmenting and unity matrix operation, the redundancy operation, and an addressing and writing operation;
   allocating, by the coordinating computing device, the segmenting and unity matrix operation to the first computing device, the redundancy operation to a second computing device of the available computing devices, and the addressing and writing operation to a third computing device of the available computing devices;
   coordinating, by the coordinating computing device, execution of the segmenting and unity matrix operation by the first computing device to segment the data object into a set of data segments and apply a unity matrix to each data segment of the set of data segments to create a first plurality of sets of encoded data slices of the plurality of sets of encoded data slices;
   coordinating, by the coordinating computing device, execution of the redundancy operation by the second computing device to apply the redundancy operation on each data segment of the set of data segments to produce a remaining plurality of sets of encoded data slices of the plurality of sets of encoded data slices; and
   coordinating, by the coordinating computing device, execution of the addressing and writing operation by the third computing device to produce the corresponding plurality of sets of slice names for the plurality of sets of encoded data slices and to write the plurality of sets of encoded data slices based on the corresponding plurality of sets of slice names to the set of storage units of the DSN.

4. The method of claim 1 further comprises:
   dividing, by the coordinating computing device, the dispersed storage error encoding of the data object into a first operation including the segmenting operation, the unity matrix operation, a first portion of the addressing operation, and a first portion of the writing operation, and a second operation including the redundancy operation, a second portion of the addressing operation, and a second portion of the writing operation;

allocating, by the coordinating computing device, the first operation to the first computing device and the second operation to a second computing device of the available computing devices;

coordinating, by the coordinating computing device, execution of the first operation by the first computing device to segment the data object into a set of data segments, apply the unity matrix operation to each data segment of the set of data segments to create a first plurality of sets of encoded data slices of the plurality of sets of encoded data slices, produce a corresponding first plurality of sets of slice names of the corresponding plurality of sets of slice names for the first plurality of sets of encoded data slices, and to write the first plurality of sets of encoded data slices based on the corresponding first plurality of sets of slice names to the set of storage units of the DSN; and coordinating, by the coordinating computing device, execution of the second operation by the second computing device to apply the redundancy operation to each data segment of the set of data segments to create a remaining plurality of sets of encoded data slices of the plurality of sets of encoded data slices, to produce a corresponding remaining plurality of sets of slice names of the corresponding plurality of sets of slice names for the remaining plurality of sets of encoded data slices, and to write the remaining plurality of sets of encoded data slices based on the corresponding remaining second plurality of sets of slice names to the set of storage units of the DSN.

5. The method of claim 1 further comprises:
dividing, by the coordinating computing device, the encoding matrix operation of the dispersed storage error encoding of the data object into a unity matrix operation, a first redundancy operation, and a second redundancy operation;
allocating, by the coordinating computing device, the unity matrix operation to the first computing device, the first redundancy operation to a second computing device of the available computing devices, and the second redundancy operation to a third computing device of the available computing devices; and
coordinating, by the coordinating computing device, execution of the unity matrix operation by the first computing device, the first redundancy operation by the second computing device, and the second redundancy operation by the third computing device to dispersed storage error encode the data object into the plurality of sets of encoded data slices.

6. The method of claim 1, wherein the coordinating computing device is a computing device of the available computing devices.

7. The method of claim 1 further comprises:
determining, by the coordinating computing device, the available computing devices by at least one of a default setting and a loading function.

8. The method of claim 1, wherein the coordinating of the execution of the plurality of operations comprises at least one of:
sending, by the coordinating computing device, operation result destination instructions to the available computing devices, wherein an operation result destination instruction of the operation result destination instructions directs a computing device of the available computing devices to send a result of an executed operation of the plurality of operations to a particular location; and sending, by the coordinating computing device, a dispersed error encoding division scheme to each computing device of the available computing devices, wherein the dispersed error encoding division scheme includes a list of each operation of the plurality of operations and a corresponding computing device of the available computing devices assigned to execute the operation.

9. A coordinating computing device of a dispersed storage network (DSN), the coordinating computing device comprises:
an interface;
memory; and
a processing module operably coupled to the memory and the interface, wherein the processing module is operable to:
divide dispersed storage error encoding of a data object into a plurality of operations, based on at least one of the data object and available computing devices for executing the dispersed storage error encoding, wherein an operation of the plurality of operations includes at least a portion of: a segmenting operation, an encoding matrix operation, an addressing operation, and a writing operation, wherein the encoding matrix operation includes a unity matrix operation and a redundancy operation; allocate the plurality of operations to the available computing devices, wherein at least one of the plurality of operations is allocated to a first computing device of the available computing devices; and coordinate execution of the plurality of operations by the available computing devices to dispersed storage error encode the data object into a plurality of sets of encoded data slices and a corresponding plurality of sets of slice names, and write the plurality of sets of encoded data slices based on the corresponding plurality of sets of slice names to a set of storage units of the DSN.

10. The coordinating computing device of claim 9, wherein the processing module is further operable to:
divide the dispersed storage error encoding of the data object into the segmenting operation, the encoding matrix operation, the addressing operation, and the writing operation;
allocate the segmenting operation to the first computing device, the encoding matrix operation to a second computing device of the available computing devices, the addressing operation to a third computing device of the available computing devices, and the writing operation to a fourth computing device of the available computing devices;
coordinate execution of the segmenting operation by the first computing device to segment the data object into a set of data segments;
coordinate execution of the encoding matrix operation by the second computing device to apply an encoding matrix to each data segment of the set of data segments to produce the plurality of sets of encoded data slices;
coordinating execution of the addressing operation by the third computing device to produce the corresponding plurality of sets of slice names for the plurality of sets of encoded data slices; and
coordinate execution of the writing operation by the fourth computing device to write the plurality of sets of encoded data slices based on the corresponding plurality of sets of slice names to the set of storage units of the DSN.

11. The coordinating computing device of claim 9, wherein the processing module is further operable to:
- divide the dispersed storage error encoding of the data object into a segmenting and unity matrix operation, the redundancy operation, and an addressing and writing operation;
- allocate the segmenting and unity matrix operation to the first computing device, the redundancy operation to a second computing device of the available computing devices, and the addressing and writing operation to a third computing device of the available computing devices;
- coordinate execution of the segmenting and unity matrix operation by the first computing device to segment the data object into a set of data segments and apply a unity matrix to each data segment of the set of data segments to create a first plurality of sets of encoded data slices of the plurality of sets of encoded data slices;
- coordinate execution of the redundancy operation by the second computing device to apply the redundancy operation on each data segment of the set of data segments to produce a remaining plurality of sets of encoded data slices of the plurality of sets of encoded data slices; and
- coordinate execution of the addressing and writing operation by the third computing device to produce the corresponding plurality of sets of slice names for the plurality of sets of encoded data slices and to write the plurality of sets of encoded data slices based on the corresponding plurality of sets of slice names to the set of storage units of the DSN.

12. The coordinating computing device of claim 9, wherein the processing module is further operable to:
- divide the dispersed storage error encoding of the data object into a first operation including the segmenting operation, the unity matrix operation, a first portion of the addressing operation, and a first portion of a writing operation, and a second operation including the redundancy operation, a second portion of the addressing operation, and a second portion of the writing operation;
- allocate the first operation to the first computing device and the second operation to a second computing device of the available computing devices;
- coordinate execution of the first operation by the first computing device to segment the data object into a set of data segments, apply the unity matrix operation to each data segment of the set of data segments to create a first plurality of sets of encoded data slices of the plurality of sets of encoded data slices, produce a corresponding first plurality of sets of slice names of the corresponding plurality of sets of slice names for the first plurality of sets of encoded data slices, and to write the first plurality of sets of encoded data slices based on the corresponding first plurality of sets of slice names to the set of storage units of the DSN; and
- coordinate execution of the second operation by the second computing device to apply the redundancy operation to each data segment of the set of data segments to create a remaining plurality of sets of encoded data slices of the plurality of sets of encoded data slices, to produce a corresponding remaining plurality of sets of slice names of the corresponding plurality of sets of slice names for the remaining plurality of sets of encoded data slices, and to write the remaining plurality of sets of encoded data slices based on the corresponding remaining second plurality of sets of slice names to the set of storage units of the DSN.

13. The coordinating computing device of claim 9, wherein the processing module is further operable to:
- divide the encoding matrix operation of the dispersed storage error encoding of the data object into a unity matrix operation, a first redundancy operation, and a second redundancy operation;
- allocate the unity matrix operation to the first computing device, the first redundancy operation to a second computing device of the available computing devices, and the second redundancy operation to a third computing device of the available computing devices; and
- coordinate execution of the unity matrix operation by the first computing device, the first redundancy operation by the second computing device, and the second redundancy operation by the third computing device to dispersed storage error encode the data object into the plurality of sets of encoded data slices.

14. The coordinating computing device of claim 9, wherein the coordinating computing device is a computing device of the available computing devices.

15. The coordinating computing device of claim 9, wherein the processing module is further operable to:
- determine the available computing devices by at least one of a default setting and a loading function.

16. The coordinating computing device of claim 9, wherein the processing module is operable to coordinate the execution of the plurality of operations by at least one of:
- sending operation result destination instructions to the available computing devices, wherein an operation result destination instruction of the operation result destination instructions directs a computing device of the available computing devices to send a result of an executed operation of the plurality of operations to a particular location; and
- sending a dispersed error encoding division scheme to each computing device of the available computing device, wherein the dispersed error encoding division scheme includes a list of each operation of the plurality of operations and a corresponding computing device of the available computing devices assigned to execute the operation.

* * * * *